Nov. 1, 1932. W. ESMARCH 1,885,810
PROCESS FOR THE SEPARATION OF ELECTRICALLY CHARGED PARTICLES
FROM FLUIDS WITH THE AID OF AN ELECTRIC CURRENT
Filed March 5, 1929
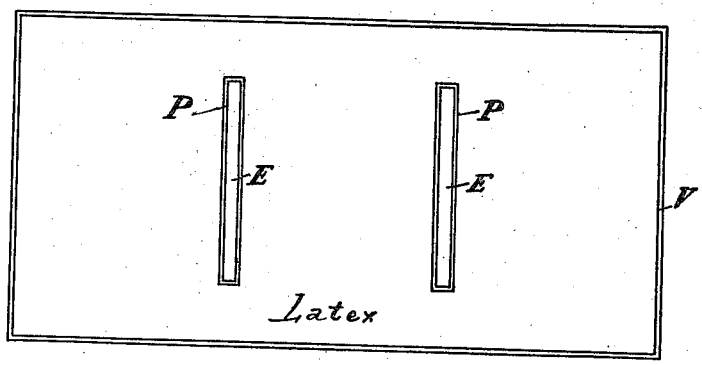
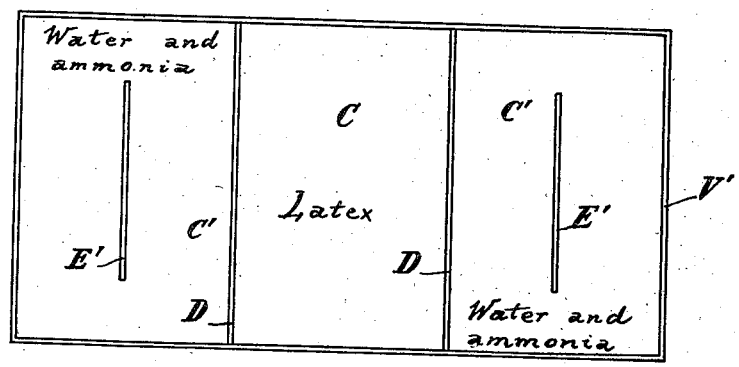
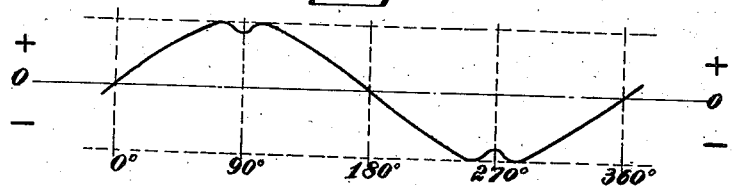
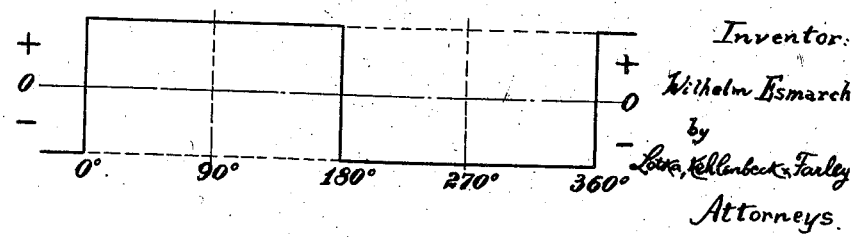
Inventor:
Wilhelm Esmarch
by
Lowe, Kellenbeck & Farley
Attorneys.

Patented Nov. 1, 1932

1,885,810

UNITED STATES PATENT OFFICE

WILHELM ESMARCH, OF BERLIN-HALENSEE, GERMANY, ASSIGNOR TO SIEMENS & HALSKE, AKTIENGESELLSCHAFT, OF SIEMENSSTADT, NEAR BERLIN, GERMANY, A CORPORATION OF GERMANY

PROCESS FOR THE SEPARATION OF ELECTRICALLY CHARGED PARTICLES FROM FLUIDS WITH THE AID OF AN ELECTRIC CURRENT

Application filed March 5, 1929, Serial No. 344,600, and in Germany March 12, 1928.

The separation of electrically charged particles from fluid, by means of continuous current electricity is already known. For example, by passing a continuous current through latex a layer of rubber can be separated out on to the anode. With this known process comparatively high potentials must be applied on the one hand, and on the other hand the quality of the separated product is frequently deteriorated through the gas developed therein and through the inclusion of fluid.

Now in accordance with the invention the surprising discovery has been made that the separation of the particles also takes place if the fluid is treated with alternating current the average value of which is zero. For this purpose the most suitable alternating current is that having a frequency of 20 to 150, but also higher frequencies may be employed. The effect varied according to the electrodes used. It was found that the best results were obtained when both electrodes were made of aluminium or an aluminium alloy. Tantalum and its alloys also proved to be suitable for the electrode material. With the new process it was possible to use a considerably reduced strength of current as compared with the known continuous current process. The voltage may lie between 40–150 volts or more. The best results are generally obtained when the voltage is increased during the separation, either intermittently or continuously.

The quality and the yield of the separation product were most favourable when the electrodes were covered with a porous layer, for example plaster of Paris. Non-conducting or semi-conducting materials are suitable for forming the porous layer. Similar effects are also obtained by coverings of metal oxides. In such cases electrodes of iron, lead and other metals also gave good results, which were however always inferior to those obtained by the use of electrodes made of tantalum, aluminium or their alloys with other metals. By the use of electrodes covered with porous material, a considerably reduced voltage can be used as compared with previous processes, for example between 20 and 50 volts. Particularly favourable effects were obtained with this method of working the new process when the voltage was held constant during the operation. The new process showed particularly good results when applied to the separation of rubber from latex milk. Excellent layers of rubber were obtained on both electrodes, whose quality could be varied according to the purpose for which it was to be used by the addition of suitable material to the latex milk, such as dyes, sulphur, soot etc. In general it proved to be advisable to suspend in the latex milk such material as, owing to its (electrical) sign, would exhibit the same electrical charge as the latex particles. In this connection it is immaterial whether the commercial latex milk is used directly as exported or whether it is previously converted by the addition of compounds containing ions of a higher value, such as thorium nitrate. In many cases when using the new process it is advisable to separate the electrodes completely from the latex milk by porous walls, and to introduce either water or a solution in water of salts, acids or alkalis, into the electrode space. For particular purposes such dielectric liquids as oils, glycerine and alcohol may also be used as filling material for the electrode space. In many cases it has been found advisable to renew continually the liquid in the electrode space during the operation.

The separation product obtained by using the new process was of a high quality, particularly on account of the fact that through the use of alternating current gas only developed at the electrodes to a very small extent, and for the most part did not occur at all.

Reference is to be had to the accompanying drawing in which Figs. 1 and 2 are plan views of two forms of apparatus suitable for carrying out my invention; and Figs. 3 and 4 are diagrams showing two wave forms of currents such as I may employ in my invention.

Examples

I have used in all the following examples commercial latex and an alternating current of a frequency of 50.

(1) As electrodes plates of aluminium were provided. The voltage was 130 volts and the current density 0,22 amp. per sq. cm. The average intensity of current was 0,9 amp., the average power 117 watts, the duration of test 3 minutes and the energy consumption 5,8 w. h. The yield of rubber amounted to 1,2 grammes, that is 0,21 kg. of rubber for 1 kwh.

(2) Two lead electrodes covered with a porous layer of plaster of Paris. The voltage was 39,2 volts, the current intensity 1 amp., the current density 0,014 amp. per sq. cm., the power 39 watts, the duration of test 10 minutes and the energy consumption 6,5 wh. The yield of rubber amounted to 7,5 grammes, that is 1,15 kg. of rubber per 1 kwh.

(3) The same electrodes as in the test (2) were used. An apparatus suitable for carrying out this example as shown in Fig. 1, where V indicates the container or vat, E the electrodes, and P the porous layer of plaster of Paris covering these electrodes. The voltage amounted to 26 volts, the intensity of current 0,5 amp., the current intensity 0,007 amp. per sq. cm., the power 13 watts, the duration of test 20 minutes and the energy consumption 4,3 wh. The yield of rubber was 8,4 grammes, that is 1,95 kg. of rubber for 1 kwh.

(4) Under the same working conditions as in the test (2) but when employing a lead electrode and a zinc electrode, both covered with a porous layer of plaster of Paris instead of two covered lead electrodes the yield of rubber was 0,05 kg. for 1 kwh.

Tests with electrodes of different metals have shown that also when these electrodes were not covered with a porous layer, good results were obtained.

(5a) A so-called three-cell apparatus was used, the middle chamber of which was separated from the outer electrode spaces by diaphragms which consisted of woven material impregnated with chrome gelatine. Two bodies of carbon served as electrodes. The electrode-chambers were filled with water to which a quantity of ammonia was added equal to that of the latex. The latex was introduced into the middle chamber. The deposition of rubber took place on the diaphragm surfaces, which touch the latex.

A three-cell apparatus such as just referred to is illustrated in Fig. 2, where V' indicates the container or vat, E' the electrodes, and C, C' the three compartments into which the vat V' is divided by the diaphragms D.

The voltage was 30 volts, the current density 0,0022 amp. per sq. cm., the energy consumption 10 wh and the duration of test 10 minutes. The yield of rubber amounted to 6,0 grammes, that is 0,6 gramme for 1 wh.

(5b) The chambers containing the electrodes were filled with an aqueous solution of 20% calcium chloride. The construction of the three-cell apparatus was the same as in test (5a). When using a voltage of 20 volts, a duration of test of 10 minutes and the same current density as in test (5a) the yield of rubber amounted to 8,7 grammes, that is 1,32 grammes for 1 wh. The energy consumption was 6,6 wh. The yield of rubber was in this case very much greater than in test (5a) and also the quality of rubber was better.

It will be understood, that in all the tests the yield of rubber is the sum of the quantities deposited on both electrodes in the tests (1) to (4) and on both diaphragms in the tests (5a) and (5b).

A further development of the improved process consists in the way of enabling undesirable effects which may occur in the properties of the separated latex, particularly due to departing from the correct working conditions, to be subsequently corrected in many cases.

In accordance with the invention this result is obtained by bringing the support, carrying the separated layer of latex, from the electrolytic bath into an acid solution, for example, into a weak solution of acetic acid. These supports are either the electrodes or the porous moulds or diaphragms previously applied. It has been found that the firmness particularly of the separated layer of latex is considerably increased and that, in addition, by using the new process, the layer of latex can be particularly easily released from the support. Instead of acetic acid other acids may also be used in the same way, such as carbonic acid, weak hydrochloric acid and the like. Only a short period of immersion in the acid solution is necessary in order to bring about the favorable effects mentioned.

While experimenting with the improved process, the surprising fact was found that the yield of rubber per watt from a solution of latex was not the same when the alternating current was obtained from different generators, although the frequency was the same and the working conditions were otherwise the same. The closer examination of this peculiar phenomenon showed that the current curves of the alternating currents supplied by the different generators, as shown by means of an oscillograph, had different forms. It appeared that, in general, the yield of rubber per watt under otherwise similar working conditions was the greater, the more the current curve of the alternating current used departed from a sinusoidal form.

In cases where the alternating current available does not already show such departures in its current curve, these can, in accordance with the invention, be artificially created in various ways, and thereby the best possible yield can be obtained for a given latex solution.

For example, for this object, choke coils can be connected in the supply circuit with or without iron cores, or condensers may be used, or combinations of both such elements. Alternatively, I may supply to the latex solution an alternating current which is the resultant of two or more superimposed alternating currents. In this way it is possible, by making use, for example, of means to alter the phase relation between the individual alternating current curves, to produce a resultant which departs from the sinusoidal form by an amount which is found to give the best results from time to time.

Particularly good results are obtained with the new method when the alternating current supply is produced from a continuous current by the use of rotating or oscillating commutators or the like. In this case a current curve is obtained whose variations above and below the zero line form right angles with said line. Such a curve is shown in Fig. 3. With the examples of the invention previously given a current curve has proved to be particularly favourable, which shows one or more small or large indentations in the neighbourhood of the positive and negative maximum. Such a curve is shown in Fig. 4. I desire it to be understood that when employing an alternating current departing from the sinusoidal form, such current was still a balanced current, that is to say, its average value was zero.

It appeared that the influence of the shape of the current curve on the yield of rubber is not the same with all solutions of latex. This influence of the current curve form was particularly marked with those solutions whose concentration was relatively low.

The following working example will serve to explain the new method:

Two commercial solutions of latex, of which one had a rubber content of 30% and the other was diluted to a rubber content of 10%, were treated in accordance with the process as described above with an alternating current having a frequency of 16 cycles per second. Two tests were made with each of these solutions. In the first place each solution was subjected to an alternating current whose current curve had practically a sinusoidal form, and in the second case to an alternating current which was generated from a continuous current by means of a rotating commutator. In both cases the voltage was about 20 volts. The effective current strength was approximately 20 milli-amperes per sq. cm. Each test lasted 20 minutes. The treatment of the 30% solution of latex gave, with both types of current, yields of 3.1 and 3.2 grammes of rubber per watt, thus practically the same quantity in each case. In the case of the 10% solution of latex the difference was decidedly greater. The corresponding yield of rubber was, in this case, 1.4 and 2.4 grammes of rubber per watt, i. e. there was an increase in the yield of rubber of some 75%, due to the alteration of the current curve.

An example of a method of carrying out the improved process has already been given above, in which a porous body is arranged in front of each electrode, thus marking a central space which is filled with latex and two electrode spaces which are separated from this central space by the porous bodies and into which electrolyte is introduced. It has been found that as porous bodies, either ceramic material or fabric such as, for example, muslin, or fabrics impregnated with chrome gelatine, or similar material, can be used.

According to another modification of the invention, at the same time as the electrolyte is introduced into the electrode spaces, or instead of using this method, electrolyte is used to impregnate the porous layer, this latter being made of non-conducting or badly conducting material, and used in accordance with the process mentioned above to envelop the electrodes. If desired, the electrolyte can also be introduced into the latex. In all cases those electrolytes are particularly suitable which produce ions capable of accelerating the coagulation of the separated rubber, for example, calcium-chloride or magnesium-chloride, as well as ammonium-chloride, or dilute acetic acid. By the use of this method the uniformity of the rubber separation is particularly improved as is also the firmness of the rubber produced, and the yield is increased.

While the addition of electrolytes to the fluids in the electrode spaces has, in general, a favourable effect with all concentrations of the latex, as has also the application of such electrolytes to the impregnation of the electrodes covered with plaster of Paris or porous ceramic material, the addition of special electrolytes to the latex is particularly advisable when using comparatively strongly diluted solutions. With this latter application of the electrolytes, however, their concentration in the latex must, in general, be made much less than in the electrode spaces. The favourable effect of the addition of such electrolytes to the latex is also remarkable in the absence of porous bodies in front of the electrodes.

*Working example*

Two lead electrodes, each provided with a covering of plaster of Paris, were immersed in a solution of commercial latex, the plaster of Paris sheaths having previously been saturated with water. The usual alternating current supply of 50 periods was used to feed the electrodes, a potential of 42 volts being applied. The test was continued for 10 minutes. The energy absorbed was 14 w. h. The yield of rubber on the two electrodes was 16.1 grammes, thus giving a yield per w. h. of 1.15 grammes.

Following this the same plaster covered lead electrodes were saturated with a 20% solution of calcium-chloride, lightly rinsed in water and then immersed in the same latex as previously. The same alternating current was applied as in the first case, and the test continued for the same length of time. The potential was, in this case 38 volts and the energy absorbed was 12.6 w. h. The yield of rubber was 27 grammes, equal to 2.15 grammes per w. h. In both cases the current strength amounted to 0.0021 amp. per sq. cm.

From this example it is thus seen that by the application of the new process the yield of rubber is almost doubled under otherwise equal working conditions.

It should here be mentioned that, as is known, a certain amount of rubber is separated merely by immersing porous bodies in latex, without the application of electric current. When the plaster covered lead electrodes saturated with a solution of calcium-chloride, were immersed for 10 minutes in the latex solution used for the above mentioned tests, without current, only a very little rubber, namely 5.4 grammes, separated out, this being decidedly softer and in places even in a pulpy condition. Even less rubber was separated when the same plaster covered lead electrodes were immersed for 10 minutes in the same solution of latex, but without being previously saturated. The rubber obtained in both the tests first described above was considerably firmer than the rubber separated by simple immersion without the application of an electric current.

The test gave similar results when electrolytes were added to the latex before treating with alternating current. Here also there was an increase in the yield, particularly with strongly diluted solutions of latex. By the simultaneous application of two or all three applications of electrolyte mentioned, the yield of rubber may be correspondingly increased still further.

I claim:—

1. In a process for the separation of rubber from latex the step of leading an alternating current, the average value of which is zero, through the latex.

2. In a process for the separation of rubber from latex the step of leading an alternating current, the average value of which is zero, through the latex and removing the deposited layer of rubber from the bath and immediately immersing it in an acid solution.

3. A process for the separation of rubber from latex which consists in dipping two electrodes of the same material in the latex and connecting said electrodes to such a source of balanced alternating current, whose current curve departs from the sinusoidal form.

4. The process of separating rubber from latex, which consists in bringing such latex in contact with two electrodes, and passing a balanced alternating current of relatively low voltage through said latex by way of said electrodes, whereby particles of rubber will be deposited in coagulated form at both of said electrodes.

5. The process of separating rubber from latex, which consists in bringing such latex in contact with two electrodes, and passing through said latex by way of said electrodes, a balanced alternating current departing from the sinusoidal form, whereby particles of rubber will be deposited in coagulated form at both of said electrodes.

6. A process according to claim 4 in which a potential of about 20–150 volts is employed.

7. A process according to claim 4, in which metallic electrodes are employed.

8. A process according to claim 4, in which the electrodes are metallic and provided with a porous layer of non-conducting material.

9. A process according to claim 4, in which foreign substances such as dyes sulfur, are added to the latex.

10. In a process for the separation of rubber from latex, the step of passing through the latex a balanced alternating current whose current curve departs from the sinusoidal form.

11. In a process for the separation of rubber from latex, the step of passing through the latex a balanced alternating current obtained by commutating a direct current.

In testimony whereof I affix my signature.

WILHELM ESMARCH.